United States Patent
Ke

(10) Patent No.: US 7,817,358 B2
(45) Date of Patent: Oct. 19, 2010

(54) LENS ACTUATOR

(75) Inventor: Chau-Yuan Ke, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 36 days.

(21) Appl. No.: 12/251,730

(22) Filed: Oct. 15, 2008

(65) Prior Publication Data

US 2009/0268311 A1 Oct. 29, 2009

(30) Foreign Application Priority Data

Apr. 25, 2008 (CN) .......................... 2008 1 0301317

(51) Int. Cl.
*G02B 7/02* (2006.01)
(52) U.S. Cl. .................. 359/811; 359/694; 359/822; 359/824
(58) Field of Classification Search .................. 351/811
See application file for complete search history.

(56) References Cited

U.S. PATENT DOCUMENTS

| | | | | |
|---|---|---|---|---|
| 2007/0086770 A1* | 4/2007 | Okita et al. | ................. | 396/133 |
| 2008/0037143 A1* | 2/2008 | Yoon | .......................... | 359/824 |
| 2009/0237819 A1* | 9/2009 | Ke | .............. | 359/827 |
| 2009/0252488 A1* | 10/2009 | Eromaki et al. | ............. | 396/529 |
| 2009/0290233 A1* | 11/2009 | Chou | .......................... | 359/696 |
| 2009/0310959 A1* | 12/2009 | Shih et al. | .................... | 396/529 |

* cited by examiner

*Primary Examiner*—Jessica T Stultz
(74) *Attorney, Agent, or Firm*—Andrew C. Cheng

(57) ABSTRACT

A lens actuator includes a lens barrel for accommodating the lens, a coil wrapped around the lens barrel, four magnetic sheets, a bracket, a first resilient plate and a second resilient plate respectively connected between the bracket and the lens barrel to hold the lens barrel on the bracket. The bracket includes a hollow cubic frame body, an accommodating room extending through the top side and the bottom side of the frame body, four mounting holes in communication with the accommodating room respectively defined in the four side faces of the frame body, and a beveled edge formed on an edge of an opening of each mounting hole on the outside of the frame body. The four magnetic sheets are respectively mounted in the four mounting holes. The bracket and the lens barrel are held between the first resilient plate and the second resilient plate.

11 Claims, 5 Drawing Sheets

LENS ACTUATOR

CROSS REFERENCE TO RELATED APPLICATION

This application is related to commonly-assigned copending application Ser. No. 12/192,376, entitled "resilient plate and lens actuator with same". Disclosures of the above-identified application are incorporated herein by reference.

BACKGROUND

1. Technical Field

The present invention relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, what is needed is a lens actuator adapted for driving the lenses with more compact structure and less mechanical movement.

SUMMARY

A lens actuator includes a lens barrel for accommodating the lens, a coil warped around the lens barrel, a plurality of magnets, a bracket for mounting the magnets thereon and accommodating the lens barrel therein, and a resilient plate connected between the bracket and the lens barrel to hold the lens barrel on the bracket. The resilient plate includes a plate shaped body, a through hole defined in the center of the plate shaped body, and a plurality of slots defined in the plate shaped body and the slots cooperatively surrounding the through hole, and a plurality of fixing portions. Each of the slots includes a first substantially straight slot portion, a second substantially straight slot portion and a third substantially straight slot portion. The second substantially straight slot portion interconnects between and substantially perpendicular to the first and second substantially straight slot portions. The slots are oriented about 90 degrees with respect to each other. Each of the fixing portions is located between the through hole and the junction portion of the second and third substantially straight slot portions of the corresponding slot. A first pinhole defined in each of the fixing portions. The lens barrel comprises a plurality of first positioning pins extending through the first pinholes and protruded out from the lens barrel, and the resilient plate is fastened to the lens barrel by engagement of the first pinholes with the respective first positioning pins.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
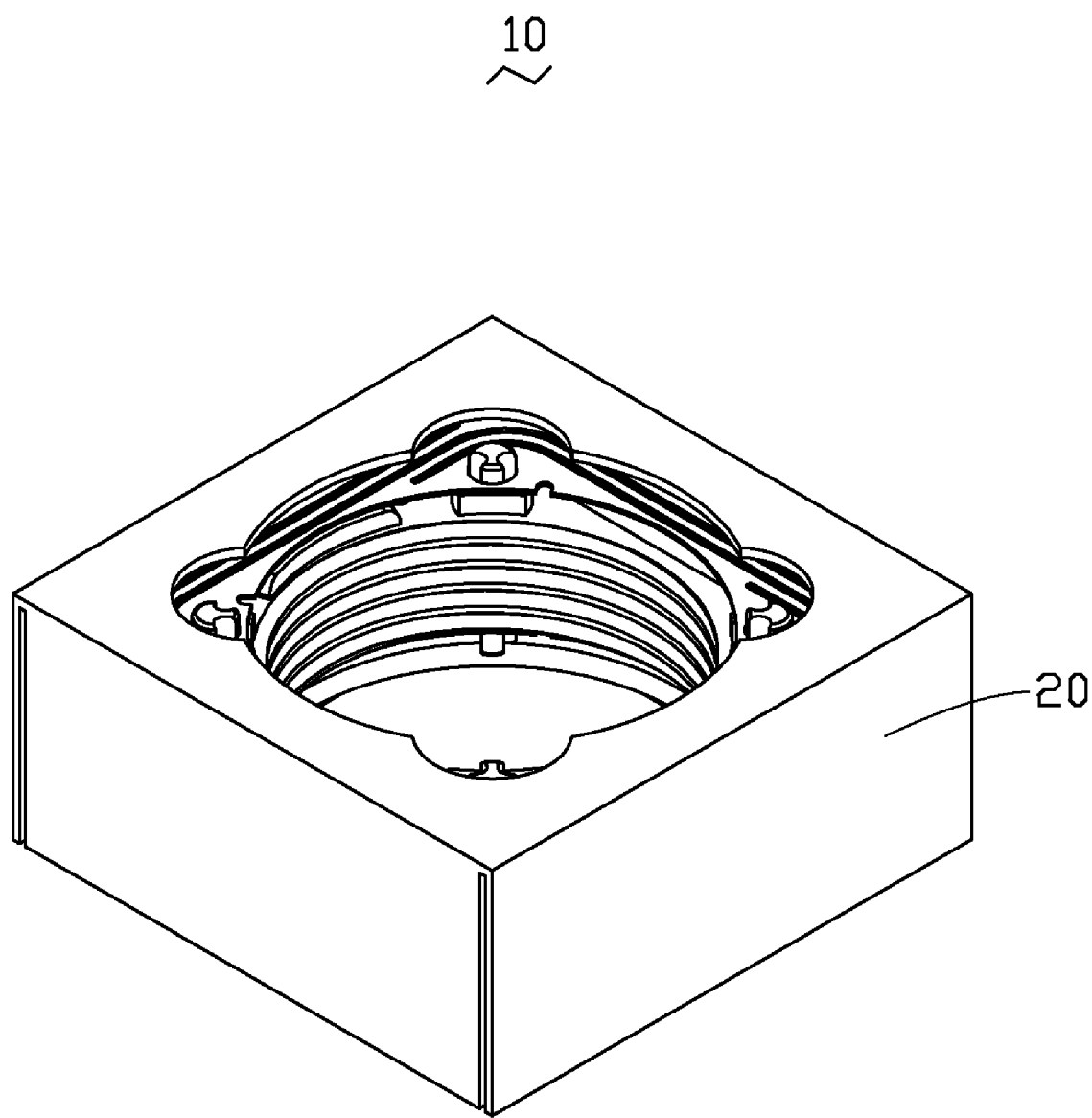
FIG. 1 is a schematic, isometric view of a lens actuator according to an exemplary embodiment of the present invention, and the lens actuator includes a bracket, a lens barrel, and a resilient plate.
Figure 2:
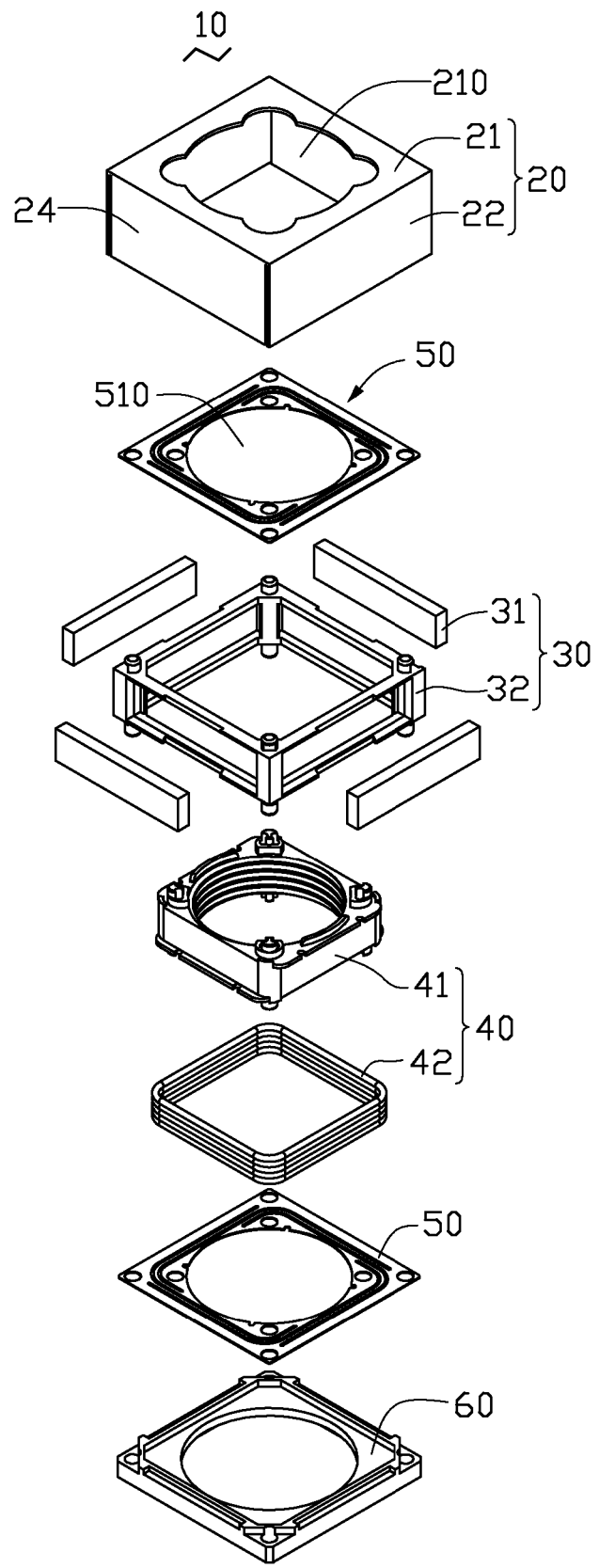
FIG. 2 is an exploded view of the lens actuator in FIG. 1.

Referring to FIGS. 1 and 2, a lens actuator 10, in accordance with an exemplary embodiment, includes a housing 20, a fixed unit 30, a movable unit 40, two resilient plates 50, and a board 60.

The housing 20 includes a panel 21, a through hole 210 defined in the center of the panel 21, two opposite first peripheral panels 22 and two opposite second peripheral panels 24 respectively perpendicularly extending from the four peripheral sides of the panel 21 and fastened to one another by a dovetail panel joint (not shown). The panel 21, the first peripheral panels 22, and the second peripheral panels 24 cooperatively define a cavity for accommodating the fixed unit 30. A material of the housing 20 is an electromagnetic shield material, such as nick alloy, conductive plastic, surface conductive material, conductive glass, etc.

Figure 3:
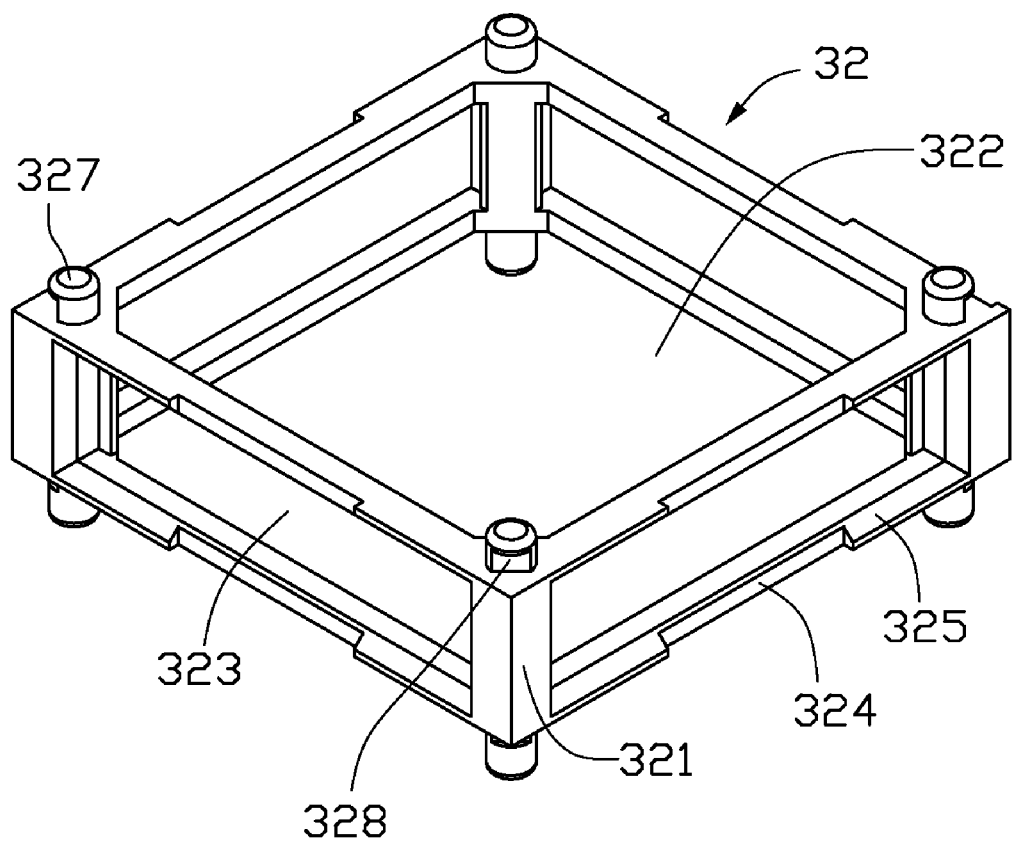
FIG. 3 is a schematic, isometric view of the bracket in FIG. 2.

The fixed unit 30 includes a cubic bracket 32 and a plurality of magnets 31. The bracket 32 includes a frame body 321 (refer to FIG. 3) receivable in the housing 20. A first accommodating room 322 is defined in the frame body 321. Four magnet mounting holes 323 are respectively formed in four sides of the frame body 321. The magnet mounting holes 323 are in communication with the first accommodating room 322. Four beveled edges 325 are respectively defined on the four inner surfaces in each of the magnet mounting holes 323, and thereby the opening of each magnet mounting holes 323 shaped as a horn. The beveled edge refers to an edge of a structure that is not perpendicular (but instead often at 45 degrees) to the faces of the piece. First gluing groove 324 can be defined in the beveled edges 325. The first gluing grooves 324 are configured for receiving an amount of the adhesive used for adhering the magnets 31 to the cubic bracket 32, and preventing it from infiltrating into the bracket 32 or at least greatly reducing the chance of occurring thereof. Four second locating pins 327 are respectively vertically protruded from the top and bottom sides of the frame body 321 at each corner thereof. The second locating pins 327 are configured for fastening the fixed unit 30 to one of the resilient plates 50. The number of the magnets 31 corresponds to that of the magnet mounting holes 323. The magnets 31 are respectively mounted in the magnet mounting holes 323. A second gluing groove 328 is defined in side surface of each of the second locating pins 327. The second gluing groove 328 is configured for receiving an amount of the adhesive used for adhering the resilient plate 50 to the cubic bracket 32.

Figure 4:
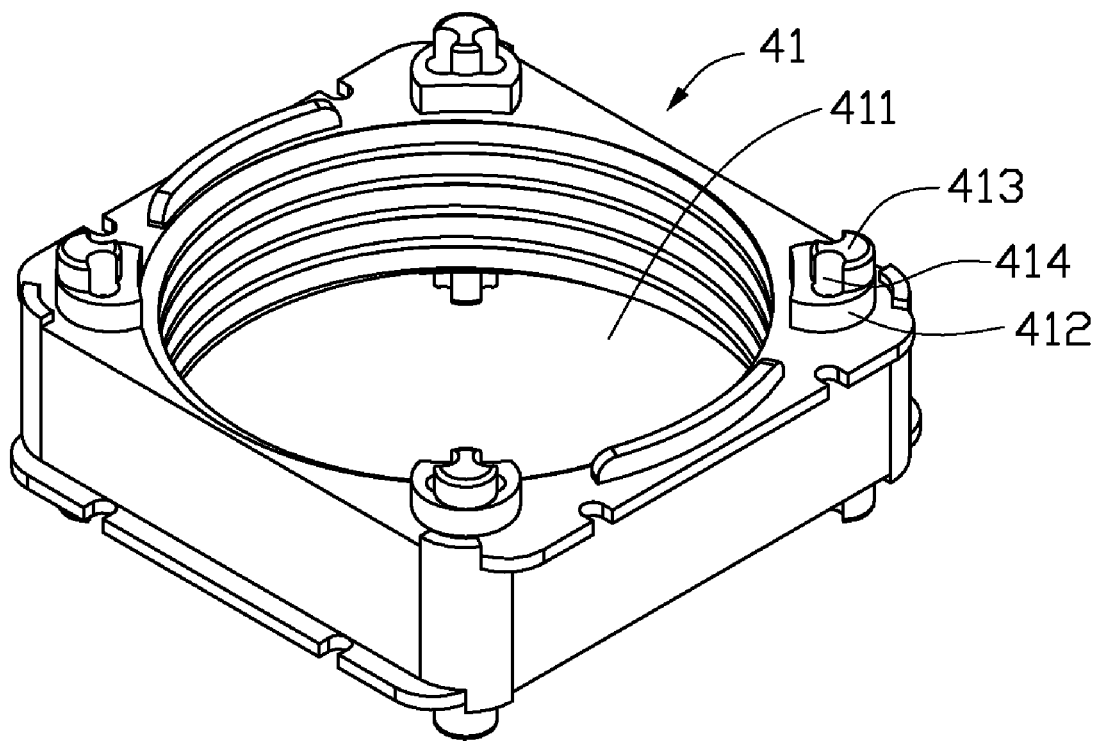
FIG. 4 is a schematic, isometric view of the lens barrel in FIG. 2.

Referring to FIGS. 2 and 4, the movable unit 40 includes a lens barrel 41 and coils 42. The movable unit 40 is accommodated in the first accommodating room 322 of the bracket 32. The lens barrel 41 defines a second accommodating room 411 for accommodating the lenses and filters (not shown). The second accommodating room 411 is a through hole. Four convex stages 412 are respectively protruded out from the top and bottom sides of the lens barrel 41 at each corner thereof. A first locating pin 413 is protruded out from the top surface of the corresponding convex stage 412. Two grooves 414 are defined in the outer sidewall of each first locating pin 413. The grooves 414 are configured for receiving an adhesive material therein. The two resilient plates 50 are respectively glued (i.e., adhesively mounted) to the top and bottom sides of the lens barrel 41 by adhesive, so as to prevent the lenses or the filters from falling out of the lens barrel 41. The coils 42 are wrapped around the side wall of the lens barrel 41.

Figure 5:
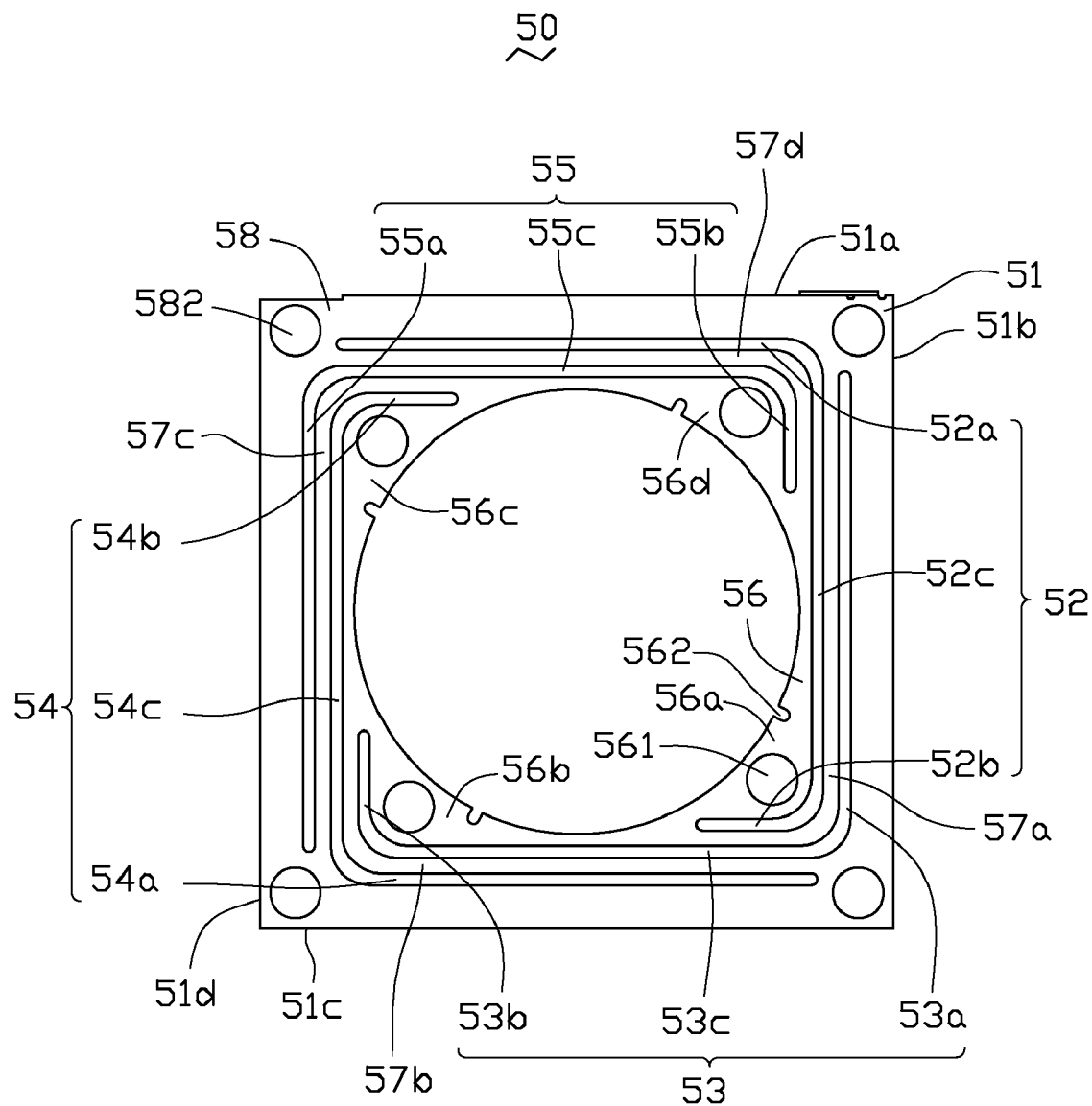
FIG. 5 is a schematic, isometric view of the resilient plate in FIG. 2.

Referring to FIG. 5, the first resilient plate 50 comprises a plate shaped body 51. In the present embodiment, the plate shaped body 51 is square shaped. The plate shaped body 51 includes a first edge 51a, a second edge 51b, a third edge 51c, and a fourth edge 51d. The first edge 51a is parallel to the third edge 51c, and the second edge 51b is parallel to the fourth edge 51d. A second through hole 510 for light passing therethrough is defined at the center of the plate shaped body 51. A first slot 52, a second slot 53, a third slot 54 and a fourth slot 55 are defined in the plate shaped body 51 around the second through hole 510. The slots (52, 53, 54, 55) are oriented about 90 degrees with respect to each other.

The first slot 52 includes a first starting portion 52a, a first ending portion 52b, and a first connecting portion 52c. The first starting portion 52a is parallel to the first edge 51a. The first ending portion 52b is parallel to the third edge 51c. The first connecting portion 52c is parallel to the second edge 51b and connected with the first starting portion 52a and the first ending portion 52b. The length of the first ending portion 52b is less than or equal to that of the first starting portion 52a. A first fixing portion 56a is formed between the second through hole 510 and the angular part or space between the first ending portion 52b and the first connecting portion 52c.

The second slot 53 includes a second starting portion 53a, a second ending portion 53b, and a second connecting portion 53c. The second starting portion 53a is parallel to the second edge 51b. The second ending portion 53b is parallel to the fourth edge 51d. The second connecting portion 53c is parallel to the third edge 51c and connected with the second starting portion 53a and the second ending portion 53b. The length of the second ending portion 53b is less than or equal to that of the second starting portion 53a. A second fixing portion 56b is formed between the second through hole 510 and the angular part or space between the second ending portion 53b and the second connecting portion 53c. The second starting portion 53a and the second connecting portion 53c are on the outer side of the first slot 52, i.e., the second starting portion 53a and the second connecting portion 53c are closer to the second edge 51b and the third edge 51c than the first slot 52. A first L-shaped resilient portion 57a is formed between the first slot 52 and the second slot 53. Since the L-shaped resilient portion 57a has an angular part or a space, the durability and flexibility of the first resilient plate 50 is enhanced.

The third slot 54 includes a third starting portion 54a, a third ending portion 54b, and a third connecting portion 54c. The third starting portion 54a is parallel to the third edge 51c. The third ending portion 54b is parallel to the first edge 51a. The third connecting portion 54c is parallel to the fourth edge 51d and connected with the third starting portion 54a and the third ending portion 54b. The length of the third ending portion 54b is less than or equal to that of the third starting portion 54a. A third fixing portion 56c is formed between the second through hole 510 and the angular part or space between the third ending portion 54b and the third connecting portion 54c. The third starting portion 54a and the third connecting portion 54c are on the outer side of the second slot 53, i.e., the third starting portion 54a and the third connecting portion 54c are closer to the third edge 51c and the fourth edge 51d than the second slot 53. A second L-shaped resilient portion 57b is formed between the second slot 53 and the third slot 54.

The fourth slot 55 includes a fourth starting portion 55a, a fourth ending portion 55b, and a fourth connecting portion 55c. The fourth starting portion 55a is parallel to the fourth edge 51d. The fourth ending portion 55b is parallel to the second edge 51b. The fourth connecting portion 55c is parallel to the first edge 51a and connected with the fourth starting portion 55a and the fourth ending portion 55b. The length of the fourth ending portion 55b is less than or equal to that of the fourth starting portion 55a. A fourth fixing portion 56d is formed between the second through hole 510 and the angular part or space between the fourth ending portion 55b and the fourth connecting portion 55c. The fourth starting portion 55a and the fourth connecting portion 55c are on the outer side of the third slot 54, i.e., the fourth starting portion 55a and the fourth connecting portion 55c are closer to the fourth edge 51d and the first edge 51a than the third slot 54. A third L-shaped resilient portion 57c is formed between the third slot 54 and the fourth slot 55. The first starting portion 52a and the first connecting portion 52c are on the outer side of the fourth slot 55, i.e., the first starting portion 52a and the first connecting portion 52c are closer to the first edge 51d and the first edge 51a than the fourth slot 55. A fourth L-shaped resilient portion 57d is formed between the fourth slot 55 and the first slot 52.

Each fixing portion (56a, 56b, 56c, 56d) defines a hole 561 corresponding to the respective first locating pin 413. The holes 561 respectively receive the four first locating pins 413 at the top or bottom side of the lens barrel 41. The fixing portion further (56a, 56b, 56c, 56d) defines a cutout 562 around the second through hole 510 for fixing one end of the coils 42 therein.

A periphery portion 58 is formed between the edges (51a, 51b, 51c and 51d) and the starting portions (52a, 53a, 54a and 55a). Four holes 582 corresponding to the respective second locating pins 327 are defined in the periphery portion 58 in four corners. Four holes 58 respectively receive the four second locating pins 327 at the bottom side of the bracket 32.

The board 60 covers over the resilient plate 50 on the top side of the housing 30.

When an electric current is applied to the terminals 501, 502 and the coils 42, the coils 42 are excited to act upon the magnets 31, thereby producing a magnetic force to drive the lens barrel 42 to move between the first resilient plate 50 and the second resilient plate 50a.

When electric current is cut off from the terminals 501, 502, the first resilient plate 50 and the second resilient plate 50a impart a pressure to the lens barrel 41 relative to the bracket 32, thereby returning the lens barrel 41 to its former position.

Further, the housing 20 and the board 60 protect the lens barrel and image sensor (not shown) against dust.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens actuator, comprising:
a lens barrel for accommodating the lens;
a coil wrapped around the lens barrel;

a bracket, comprising:
- a hollow cubic frame body having a top side, an opposite bottom side, and four side faces interconnecting the top side and the bottom side,
- an accommodating room extending through the top side and the bottom side for movably accommodating the lens barrel therein,
- four mounting holes in communication with the accommodating room respectively defined in the four side faces, and
- a beveled edge formed on an edge of an opening of each mounting hole on the outside of the frame body;

four magnetic sheets respectively mounted in the four mounting holes; and a first resilient plate located on the top side of both the frame body and the lens barrel and connecting the frame body and the lens barrel, a second resilient plate located on the bottom side of both the frame body and the lens barrel and connecting the frame body and the lens barrel, wherein the bracket and the lens barrel are held between the first resilient plate and the second resilient plate.

2. The lens actuator as claimed in claim 1, wherein the bracket further comprises a groove defined in each of the beveled edges, the grooves facing the respective magnetic sheets and configured for receiving an adhesive to adhere the magnetic sheets to the respective beveled edges.

3. The lens actuator as claimed in claim 2, wherein the lens actuator further comprises a first through hole defined in a center of the first resilient plate, a plurality of first pinholes defined in the first resilient plate, a plurality of first positioning pins corresponding to the first pinholes protruding from the top side of the lens barrel, and the first resilient plate is fastened to the lens barrel by engagement of the first pinholes with the respective first positioning pins.

4. The lens actuator as claimed in claim 3, wherein the lens actuator further comprises two grooves defined in the outer sidewall of each of the first positioning pins and configured for receiving an adhesive.

5. The lens actuator as claimed in claim 4, wherein the lens actuator further comprises a convex stage protruding from the top side of the lens barrel, and the first positioning pins protrude from the top surface of the corresponding convex stage.

6. The lens actuator as claimed in claim 2, wherein the lens actuator further comprises a plurality of second pinholes defined in a periphery portion of the first resilient plate, a plurality of second positioning pins vertically protruding from the top side of the frame body and extending through the corresponding second pinholes, and the first resilient plate is fastened to the bracket by engagement of the second pinholes with the respective second positioning pins.

7. The lens actuator as claimed in claim 3, wherein the first resilient plate further comprises a plate shaped body, and a plurality of slots defined in the plated shaped body cooperatively surrounding the through hole.

8. The lens actuator as claimed in claim 7, wherein the plate shaped body is substantially a square plate.

9. The lens actuator as claimed in claim 8, wherein the slots comprise four slots and each of the four slots is oriented at approximately right angles to adjacent slots.

10. The lens actuator as claimed in claim 9, wherein each of the slots includes a first substantially straight slot portion, a second substantially straight slot portion, and a third substantially straight slot portion, the second substantially straight slot portion interconnecting the first substantially straight slot portion and the third substantially straight slot portion.

11. The lens actuator as claimed in claim 10, wherein the second substantially straight slot portion is perpendicular to the first substantially straight slot portion and the third substantially straight slot portion and parallel to an edge of the plate shaped body.

* * * * *